W. H. HAHN.
SHOCK ABSORBER.
APPLICATION FILED MAY 19, 1919.
1,315,664. Patented Sept. 9, 1919.
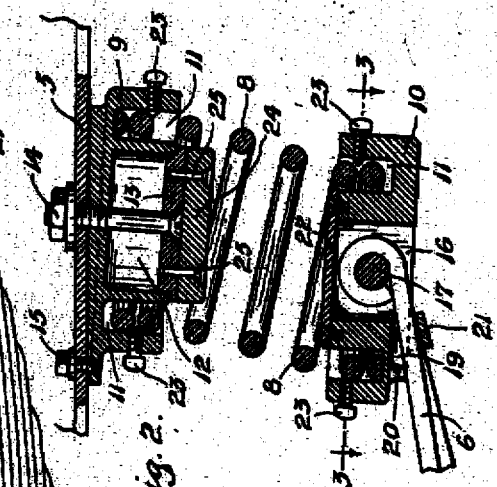
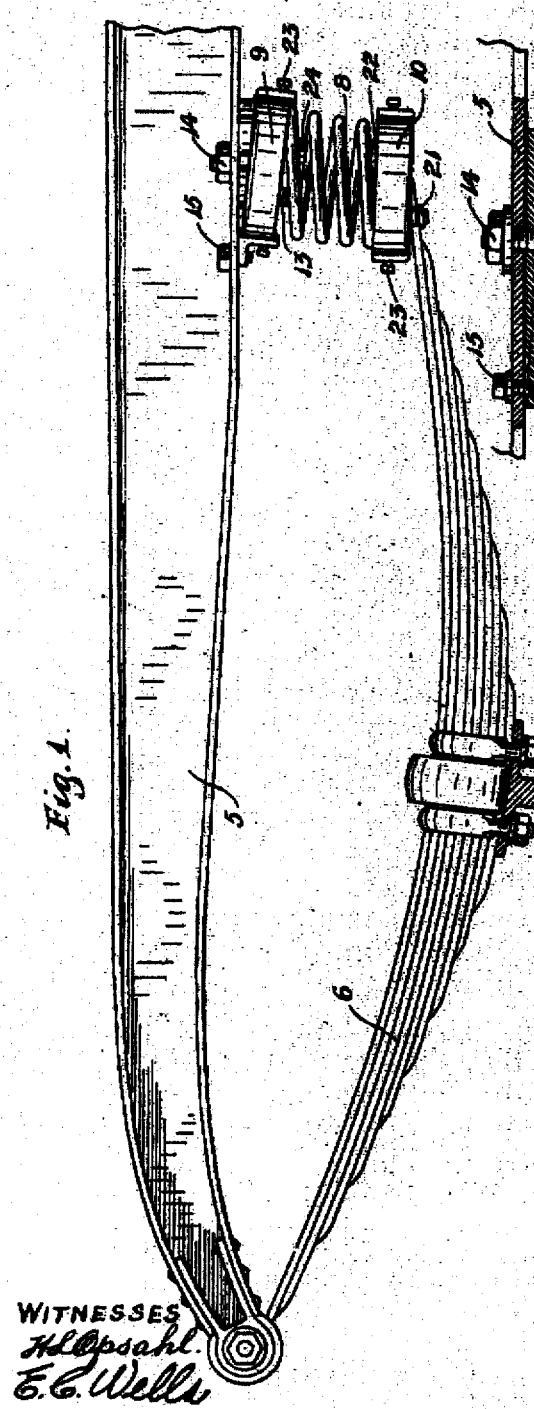
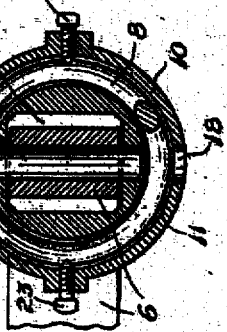
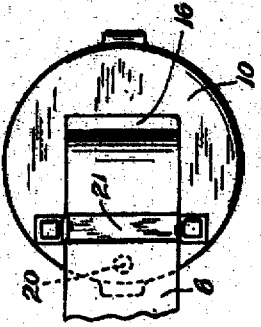
WITNESSES
H. Opsahl.
E. E. Wells.
INVENTOR.
WILLIAM H. HAHN.
BY HIS ATTORNEYS.
Williamson Merchant

UNITED STATES PATENT OFFICE.

WILLIAM H. HAHN, OF MINNEAPOLIS, MINNESOTA.

SHOCK-ABSORBER.

1,315,664.    Specification of Letters Patent.    Patented Sept. 9, 1919.

Application filed May 19, 1919. Serial No. 298,060.

*To all whom it may concern:*

Be it known that I, WILLIAM H. HAHN, a citizen of the United States, residing at Minneapolis, in the county of Hennepin and State of Minnesota, have invented certain new and useful Improvements in Shock-Absorbers; and I do hereby declare the following to be a full, clear, and exact description of the invention, such as will enable others skilled in the art to which it appertains to make and use the same.

My invention has for its object to provide an extremely simple and highly efficient shock absorber in the nature of an auxiliary spring intended for general application, but especially adapted to be interposed between the main vehicle frame and the leaf springs carried either by the front or rear axle structure or both, and takes the place of the customary shackles which connect the leaf springs to the main vehicle frame.

To the above end, generally stated, the invention consists of the novel devices and combinations of devices hereinafter defined and described in the claims.

In the accompanying drawings, which illustrate the invention, like characters indicate like parts throughout the several views.

Referring to the drawings:—

Figure 1 is a fragmentary view, principally in side elevation, showing the front leaf springs of a vehicle and the main frame thereof;

Fig. 2 is a view of the invention, principally in central vertical section, on an enlarged scale;

Fig. 3 is a view in horizontal section taken on the line 3—3 of Fig. 2; and

Fig. 4 is a bottom plan view of the parts shown in Fig. 3.

The numeral 5 indicates the front end portion of one of the side members of the main frame of a vehicle to which is pivotally connected the front end of the major leaf of a semi-elliptical spring 6 rigidly secured at its intermediate portion to the front axle 7. The improved shock absorber comprises an auxiliary coiled spring 8 interposed between a spring cap 9 and a spring base 10 having in their opposing faces annular channels 11 in which the end convolutions of said auxiliary spring are mounted. The spring cap 9 bears against the under side of the frame side member 5 and has in its lower face a recess 12 located within the respective channel 11. A bottom plate 13 closes the recess 12 and has interlocking engagement with the spring cap 10 to hold said plate against sliding movement on the spring cap. To detachably secure the spring cap 9 to the frame side member 5 and also secure the bottom plate 13 to said spring cap, there is provided a nut-equipped bolt 14 which extends axially through alined bores in the lower flange of said side member, spring cap 9 and bottom plate 13. A set screw 15 is passed through a bore in the lower flange of the side frame 5 and has screw-threaded engagement with a radial extension on the spring cap 9 to hold said cap against pivotal movement on the bolt 14.

The spring base 10 is provided with a central aperture 16 to receive, through the bottom thereof, the eye-equipped rear end portion of the major leaf of the spring 6. To connect the spring base 10 to the spring 6, a pin 17 is inserted through the eye in said spring and into a bore 18 in the spring base 10. On the bottom of the spring base 10, is a recess 19, which affords clearance for the spring 6 underlying said spring base. A lug 20, integral with the bottom of the spring base 10 and extending into the recess 19, engages the upper face of the spring 6 and positions said spring base thereon.

To prevent pivotal movement of the spring base 10 on the pin 17, and hence, in respect to the spring 6, a clip 21 is secured by screws to the bottom of said spring base, spans the recess 19 under the spring 6, and thereby holds the lug 20 against said spring. A plate 22 closes the aperture 16 and is secured by screws to the spring base 10. The end convolutions of the auxiliary spring 8 are secured in the respective channels 11 by set screws 23 having sharp ends which extend between said convolutions. These screws 23 have screw-threaded engagement with the spring cap 9 and spring base 10, and thereby lock the auxiliary spring 8 to said spring cap and base. It will be noted that the length of the pin 17 is such as to come within the auxiliary spring 8 and is thereby held against endwise displacement, as best shown in Fig. 3.

A buffer 24, of suitable resilient material, is secured by rivets 25, preferably copper, to the under face of the bottom plate 13, for engagement with the cover plate 22, under extreme compression of the auxiliary spring 8. One purpose of the buffer 24 is to prevent complete compression of the auxiliary spring 8, and a further object thereof is to prevent the spring cap 9 and spring base 10 from coming together, and thereby producing a metallic sound.

Under normal conditions, the spring base 10 is held by the spring 6 forward and out of alinement with the spring cap 9, and, in turn, holds the auxiliary spring 8 in an oblique position. When the spring 6 lengthens, under compression, the spring base 10 is moved rearward thereby into substantially vertical alinement with the spring cap 9, and thereby straightens the auxiliary spring 8 during its compression.

While the improved shock absorber is shown as interposed between the front springs and vehicle body, it may, of course, be applied between the rear ends of the rear springs and said body, but not between the forward ends of either the front or rear springs and the body.

As previously stated, the improved shock absorber affords an auxiliary spring and makes the vehicle spring, to which it is applied, more flexible, allowing the wheels to pass over road obstructions, without communicating any of the shocks to the body of the vehicle, and it also prevents the front end of the car from jumping or leaping, when striking an obstruction in the road. There are no parts in the improved shock absorber subject to wear, and no parts that are liable to squeak or rattle. By the use of the improved shock absorber, the customary shackles and their grease cups are eliminated.

The above described invention, while extremely simple and of comparatively small cost to manufacture, has, in actual usage, proven highly efficient for the purpose had in view.

What I claim is:—

1. The combination with a main vehicle frame, an axle structure and a leaf spring secured to the axle structure, of a spring cap secured to the frame, a spring base, a connecting pin extending through the eye of the major leaf of said spring and into a bore in the spring base, and an auxiliary coiled spring interposed between the spring cap and base and arranged to hold said pin against endwise removal from the eye of the leaf spring.

2. The combination with a main vehicle frame, an axle structure and a leaf spring secured to the axle structure, of a spring cap secured to the frame, a spring base, a connecting pin extending through the eye of the major leaf of said spring and into a bore in the spring base, said spring cap and base having annular channels, and an auxiliary coiled spring interposed between the spring cap and base with its ends seated in said channels, the channel in the spring base being outward of the ends of the connecting pin whereby said pin is held by the auxiliary spring against endwise removal from the eye of the leaf spring.

3. The combination with a main vehicle frame, an axle structure and a leaf spring secured to the axle structure, of a spring cap secured to the frame, a spring base, a connecting pin extending through the eye of the major leaf of said spring and into a bore in the spring base, an auxiliary coiled spring interposed between the spring cap and base and arranged to hold said pin against endwise removal from the eye of the leaf spring, and a clip for securing the spring base to the leaf spring against pivotal movement on the connecting pin.

4. The combination with a main vehicle frame, an axle structure and a leaf spring secured to the axle structure, of a spring cap secured to the frame, a spring base having a recess to receive the eye end of the major leaf of said spring, a connecting pin extending through the eye of the major leaf of said spring and into a bore in the spring base, a clip for securing the spring base to the leaf spring against pivotal movement on the connecting spring, said spring cap and base having annular channels, an auxiliary coiled spring interposed between the spring cap and base with its ends seated in said channels, the channel in the spring base being outward of the connecting pin whereby said pin is held by the auxiliary coiled spring against endwise removal from the eye of the leaf spring, and means for securing the auxiliary spring to the spring cap and base.

In testimony whereof I affix my signature in presence of two witnesses.

WILLIAM H. HAHN.

Witnesses:
CLARA DEMAREST,
HARRY D. KILGORE.